United States Patent [19]

DeMars

[11] Patent Number: 5,615,410

[45] Date of Patent: Mar. 25, 1997

[54] HEAD WEAR COMMUNICATION SYSTEM

[76] Inventor: Robert A. DeMars, 5000 N. Parkway Calabasas, Suite 233, Calabasas, Calif. 91302

[21] Appl. No.: 585,846

[22] Filed: Jan. 16, 1996

[51] Int. Cl.[6] ............................................. H04B 1/40
[52] U.S. Cl. ............................ 455/90; 455/128; 455/129; 455/351
[58] Field of Search ................................. 455/89, 90, 66, 455/95, 100, 128, 129, 344, 351; 381/169, 183, 187, 122; 2/422, 423, 906; 379/430, 58

[56] References Cited

U.S. PATENT DOCUMENTS

| 3,586,977 | 6/1971 | Lustig | 455/351 |
|---|---|---|---|
| 3,889,190 | 6/1975 | Palmer | 2/422 |
| 4,090,042 | 5/1978 | Larkin | 379/430 |
| 4,109,105 | 8/1978 | Von Statten, Jr. | 455/89 |
| 4,206,409 | 6/1980 | McKinney | 455/89 |
| 4,357,711 | 11/1982 | Drefko et al. | 455/89 |
| 4,471,174 | 11/1984 | Nava | 379/430 |
| 4,484,029 | 11/1984 | Kenney | 379/430 |
| 4,524,461 | 6/1985 | Kostanty et al. | 455/79 |
| 4,607,395 | 8/1986 | Sundahl | 455/351 |
| 4,620,068 | 10/1986 | Wieder | 455/89 |
| 4,833,726 | 5/1989 | Shinoda et al. | 455/89 |
| 4,977,975 | 12/1990 | Lazzeroni et al. | 181/129 |
| 4,979,586 | 12/1990 | Lazzeroni et al. | 181/129 |
| 5,072,209 | 12/1991 | Hori et al. | 340/432 |
| 5,142,700 | 8/1992 | Reed | 455/344 |
| 5,263,093 | 11/1993 | Nakamura et al. | 381/168 |
| 5,319,355 | 6/1994 | Russek | 455/351 |

FOREIGN PATENT DOCUMENTS

| 61-281724 | 12/1986 | Japan | 455/89 |
|---|---|---|---|

*Primary Examiner*—Reingard J. Eisenzopf
*Assistant Examiner*—Nguyen Vo
*Attorney, Agent, or Firm*—Jack C. Munro

[57] ABSTRACT

A communication system to be used between a plurality of individuals with the communication system being mounted in conjunction with head wear. Generally, the individuals are engaged in some type of related activity such as riding bicycles. Within each head wear is incorporated a receiver that is to be located directly adjacent an ear of the user. Also mounted on the head wear of each user is an elongated unit with this elongated unit including a microphone in one end thereof and an antenna at the opposite end thereof. This unit is pivotally mounted on the head wear between an inactive position and a using position. When in a using position, the microphone is located directly adjacent to the mouth of the user. When in the inactive position, the microphone is located in an out-of-the-way position spaced some distance from the mouth of the user.

8 Claims, 3 Drawing Sheets

HEAD WEAR COMMUNICATION SYSTEM

BACKGROUND OF THE INVENTION

1) Field of the Invention

The field of this invention relates to communication systems and more particularly to a communication system that is designed to be employed in conjunction with individuals when engaged in some type of activity such as bicycle riding, boating, camping and so forth.

2) Description of the Prior Art

It has long been known to use a radio which is small enough to hold in one's hand, with this radio not only being capable of receiving but also being capable of transmitting. Generally such radios are permitted to work only within a given distance. A typical distance would be within a mile. A common term in the past for such radios has been walkie-talkie.

Walkie-talkies have been commonly used in conjunction with certain sporting events. For example, within a football game the coach of a football team wears a headset so that he can communicate by radio to the quarterback. This communication is for the purpose of selecting plays or making changes in the defensive or offensive systems of the football team.

A common form of sporting activity is riding bicycles. It is common for bike riders to engage in their sport in groups of two or more. At times, one of the bike riders may become separated or observe an interesting or a potentially dangerous situation and would like to be able to communicate that to the other bike riders. However, normal verbal communication between bike riders is normally not possible because of the distance between the riders or because of exterior noise caused by cars or trucks that may be passing close by. It would be desirable to use some form of a communication type of system between bike riders with this communication system not only to provide an exchange of information between the riders but also function as a safety device to warn riders of a potentially dangerous condition. Prior to the present invention, it has not been known to utilize any type of a walkie-talkie in conjunction with bicycle riders.

SUMMARY OF THE INVENTION

The subject matter of the present invention is to provide a communication system between two or more individuals that are engaged in some form of related activity, such as a sporting activity. A typical sporting activity would be bicycle riding. Each bicycle rider, for safety reasons, would wear head wear such as a helmet. Incorporated in conjunction with each helmet is a radio receiver. Also incorporated within each helmet is an antenna and a microphone, with this antenna and microphone being mounted together in a single unit. This single unit is mounted on the exterior surface of the helmet. The antenna, microphone and receiver are all electrically connected through a radio circuit which is powered by a battery source mounted in conjunction with the helmet. The single unit is pivotally movable from an inactive (off) position to a using (on) position activating the battery power. When in the inactive position, the microphone is spaced some distance from the mouth of the user to be located in an out-of-the-way position. When in the using position, the microphone is located directly adjacent to the mouth of the user. In pivoting of the single unit there is incorporated a detent mechanism that functions to lock the single unit in both the using position and the inactive position. Upon the application of a slight manual force, the single unit can be moved from one portion of the detent arrangement to another portion of the detent arrangement. Upon activation of the transmitter, all the helmet receivers receiving the transmitters frequency will receive a beeper other than a signal to alert the individuals to activate their own head wear for receiving the transmitted signal.

The primary object of the present invention is to construct a communication system that provides for two-way radio communication between individuals in a related activity located in reasonably close proximity to each other.

Another object of the present invention is to provide a two-way radio communication system which can be operated in a substantially hands-free basis, permitting the individuals to be engaged in an activity such as a sporting activity in the normal manner so that the communication system does not interfere in any way with the engagement and safety of that activity.

Another object of the present invention is to construct a communication system which is mounted in conjunction with a helmet, with this mounting being accomplished in an attractive manner and constructed so that it is simple in operation.

Another object of the present invention is to construct a two-way communication system that can be manufactured at a relatively inexpensive price and thereby sold to the ultimate consumer at a relatively inexpensive price.

DETAILED DESCRIPTION OF THE PREFERRED EMBODIMENT

Figure 1:
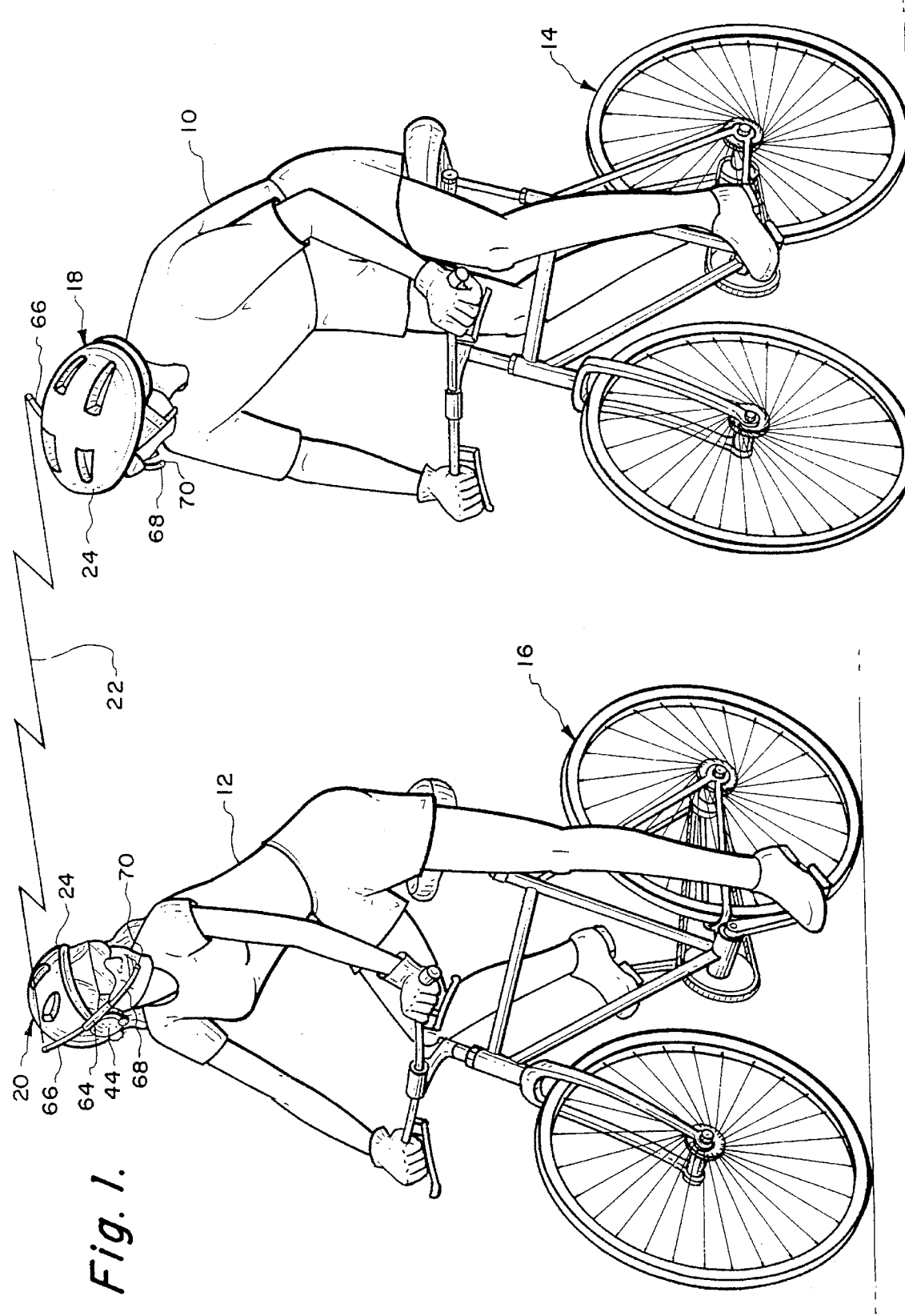
FIG. 1 is an isometric view showing a pair of bicycle riders which are utilizing the communication system of the present invention.

Referring particularly to the drawings, there is depicted in FIG. 1 a male individual 10 and a female individual 12. The male individual 10 is depicted riding a bicycle 14. The female individual 12 is depicted riding a bicycle 16. The male individual 10 is depicted wearing head wear 18. The female individual is depicted wearing head wear 20. The head wears 18 and 20 are identical except for the possibility of being of a different size. The basic configuration of each of the head wears 18 and 20 is that of a helmet. By utilizing a communication system incorporated within the helmets 18 and 20, the individuals 10 and 12 are able to communicate with each other over the airwaves which is depicted by line 22 in FIG. 1.

The helmets 18 and 20 are each formed of a rigid plastic exterior sheet material shell 24. Contained within the sheet material shell 24 is a rigid foam 26. Mounted on the exterior surface of the shell 24 and located within the concave portion of the helmets 18 and 20 are soft, resilient pads 28. The pads 28 are to rest against the head 30 of the wearer.

Embedded within the foam 26 of the helmets 18 and 20 and located directly adjacent to the left ear 32 is a battery 34. Battery 34 is connected to a central support structure 36 which is embedded within the foam 26 and is substantially centrally disposed there within. An electrical wire 38 is located within and directly adjacent to central support structure 36 and is also embedded in foam 26. The electrical wire 38 electrically connects the battery 34 to a printed circuit board 40. Mounted on the printed circuit board 40 are the components 42 that comprise a two-way radio. The actual construction of these components 42 is deemed to be conventional and does not form a specific part of this invention. The printed circuit board 40 is contained within rigid shell 44 which is also constructed of a rigid plastic material.

The rigid shell 44 is circular and is mounted within circular concavity 46 formed within the rigid shell 44. Center support member 36 includes an annular extension 48. The shell 44 includes an annular sleeve 50. The sleeve 50 is mounted on the annular extension 48 and is not capable of being disengaged therefrom by reason of locking ring 52 which engages with the annular extension 48 and abuts against the annular sleeve 50. Locking ring 52 holds the sleeve 50 as well as the rigid shell 44 in position on the annular extension 48. However, the sleeve 50 as well as the rigid shell 44 is capable of pivoting movement on the annular extension 48 within the concavity 46. The extent of this pivoting movement is represented in FIG. 2 as angle A which is about sixty degrees.

Integrally connected to the rigid shell 44 and extending therefrom is a speaker housing 54. The exterior surface of the speaker housing 54 includes a series of recesses 56 strictly for the sake of appearance. The interior of the speaker housing 54 includes a series of holes 58. Mounted within the speaker housing 54 is a speaker 60 with the speaker 60 to emit sound which is conducted through the holes 58 to the right ear 62 of the individual 10 or 12. Integrally mounted on the exterior surface of the rigid shell 44 is an elongated tube 64. Mounted on one end of the elongated tube 64 is an antenna 66 with the antenna 66 having a free outer end. The antenna 66 is to be electrically connected by wires 67 to the printed circuit board 40. The opposite end of the tube 64 has mounted therein a microphone tube 68. The microphone tube 68 is also electrically connected by wires (not shown) to printed circuit board 40. The microphone tube 68 is also capable of being pivoted relative to the tube 64. The microphone tube 68 terminates in its free outer end at a microphone 70. The position of the microphone 70 can be adjusted according to a particular individuals desires to be located a short-spaced distance from the mouth 72 of the individual as is shown in dotted lines FIG. 2 of the drawings.

Figure 2:
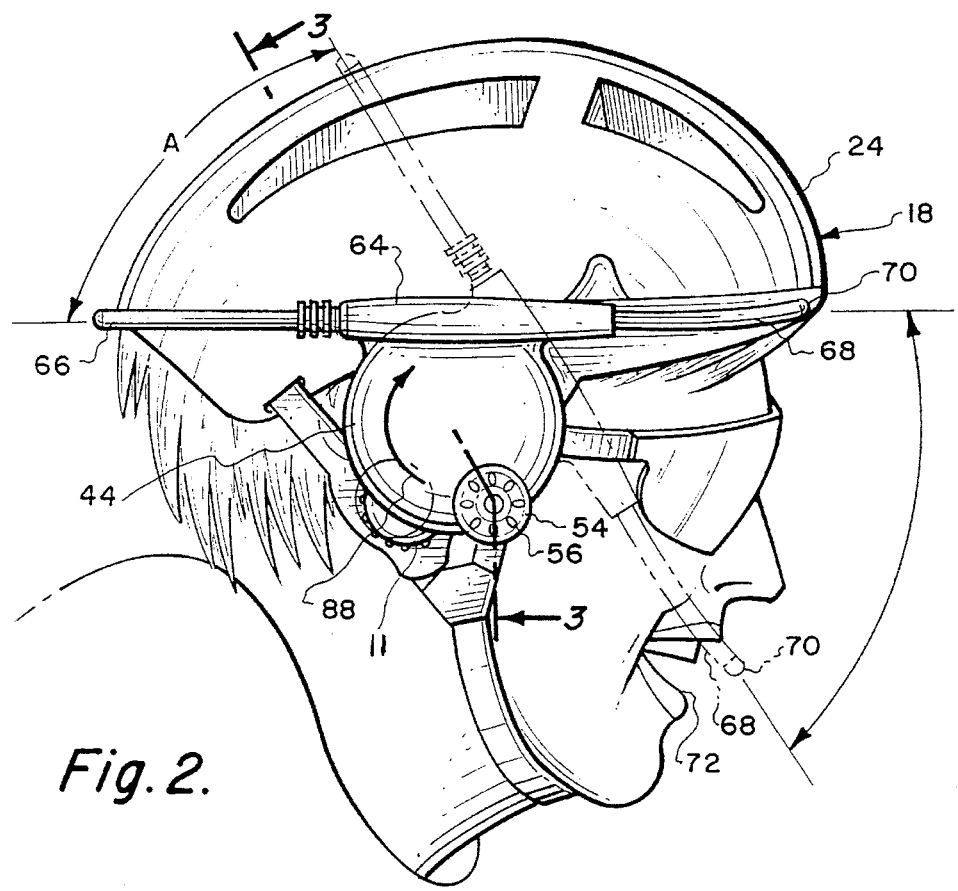
FIG. 2 is a right-side view of the helmet within which is incorporated the communication system of the present invention showing the communication system in solid lines in the inactive position and in dotted lines in the using position.

With the tube 64 in the solid line position as shown in FIG. 2 of the drawings, the antenna 66, microphone tube 68 and microphone 70 are located in the inactive position. Actually the antenna 66 may be operative at all times to receive a calling signal from another head wear. This inactive position is deemed to be substantially horizontal during normal wearing of the helmet 18 or 20. The microphone 70 and the microphone tube 68 are positioned directly against the front surface of the rigid shell 24 of the helmet 18 or 20. This is deemed to be the inactive position and in essence stows the microphone 70 so that it is "out-of-the-way."

Figures 4, 5:
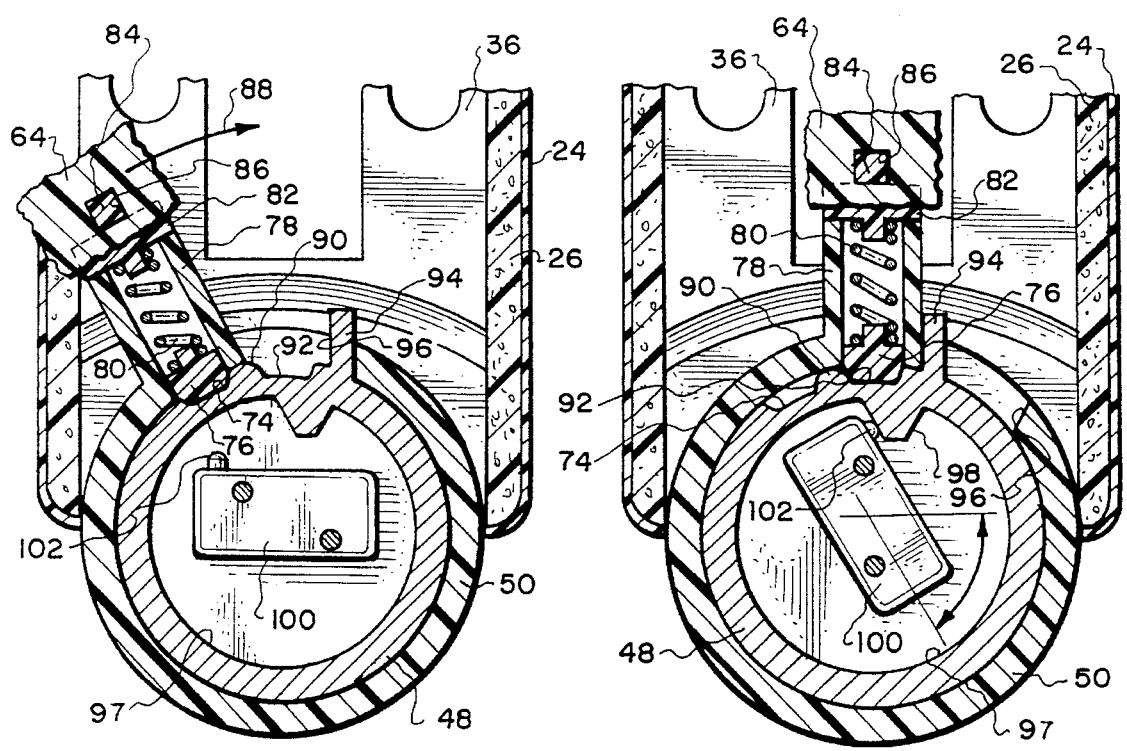
FIG. 4 is a cross-sectional view taken along line 4—4 of FIG. 3 showing the position of the detent arrangement with the communication system in the inactive position.
FIG. 5 is a cross-sectional view similar to FIG. 4 but showing the position of the detent arrangement with the communication system in the using position.
Figure 3:
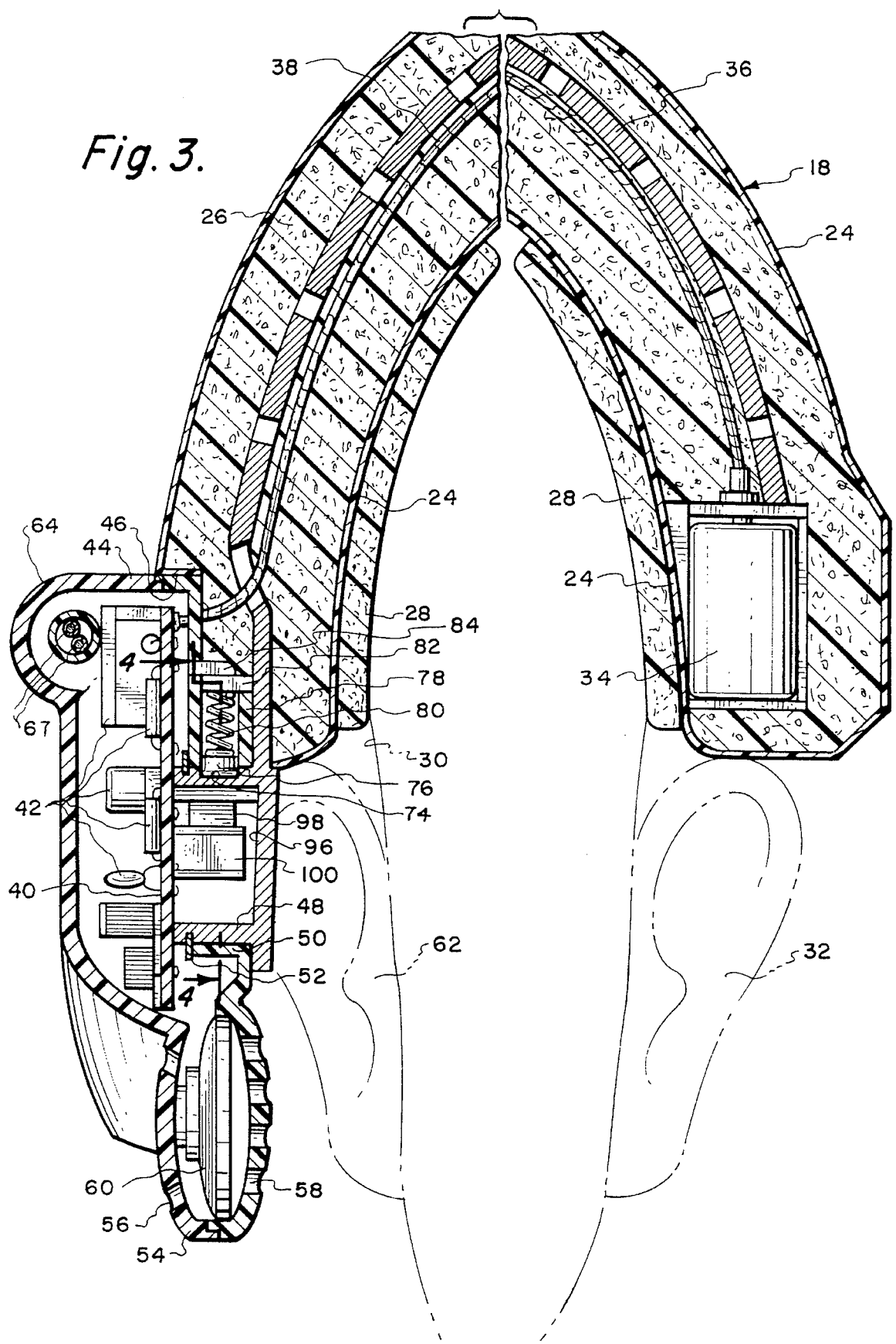
FIG. 3 is a cross-sectional view through the helmet which includes the communication system of the present invention taken along line 3—3 of FIG. 2.

Formed within the annular extension 48 is a recess 74. In FIG. 4, mounted within recess 74 is a cam plug 76. The cam plug 76 is mounted within mounting tube 78. Mounting tube 78 is integrally formed with annular sleeve 50. Located within the mounting tube 78 and an engagement with the cam plug 76 is a coil spring 80. The outer end of the coil spring 80 abuts against a plate 82. The plate 82 has integrally mounted on the exterior surface thereof an arm 84. The arm 84 is mounted within a hole 86 formed within the rigid shell 44. With the arm 84 engaged with the hole 86, the coil spring 80 is slightly compressed and retained in position between the plate 82 and the cam plug 76. This bias of the coil spring 80 tends to retain the cam plug 76 in engagement with the recess 74. Therefore, it can best be said that the elongated tube 64 is lockingly held in the inactive position.

Upon the application of a clockwise force on tube 64 which is depicted by arrow 88, the spring loaded cam plug 76 can be disengaged from the recess 74 and ride over hump 90 until cam plug 76 engages with a second recess 92. As a result, the tube 64, as well as the rigid shell 44, is locked again in position relative to the rigid shell 24 of the helmet 18 with this position being the using position shown in dotted lines in FIG. 2 of the drawings. With the cam plug 76 located within the recess 92, the mounting tube 78 abuts against upstanding member 94 which is formed integral with annular extension 48. Upstanding member 94 is located within a slot 96 formed within the annular sleeve 50. The opposite end of the slot 96 will abut against the upstanding member 94 when the cam plug 76 is located in engagement with the recess 74. Therefore, the length of the slot 96 determines the extent of pivoting movement of the tube 64 relative to the shell 24 which is approximately sixty degrees.

It is to be understood that the spacing between the recesses 74 and 92 should actually be increased in FIGS. 4 and 5 of the drawings in order to achieve the desired sixty degree movement. Within FIGS. 4 and 5 the spacings between the recesses 74 and 92 is selected so that they are located substantially adjacent to one another which is easier for the purpose of illustration. Actually within FIGS. 4 and 5, the amount of pivoting movement would appear to be about thirty degrees when in fact it is to be actually about sixty degrees.

The annular sleeve 50 includes an internal chamber 97. Integrally connected with the annular extension 48 and extending partially within the internal chamber 97 is a protrusion 98. A switch housing 100 is fixedly mounted onto the printed circuit board 40 and is located within the confines of the internal chamber 96. When the tube 64 is moved from the inactive position to the using position, the switch housing 100 is similarly moved from the position shown in FIG. 4 to the position shown in FIG. 5. The activating button 102 will come into contact with the protrusion 98 and is depressed. Depressing of the button 102 would then electrically activate the electrical circuitry mounted on the printed circuit board 40 with the result that, when the tube 64 is in the using position, voice would be picked up by the microphone 70 of helmet 18 and transmitted across the airwaves to the receiver mounted within the helmet 20 with the voice being reproduced by the speaker 60 of the helmet 20 if the tube 64 is in the using position. It is also to be understood that speaking into the microphone 70 of the helmet 20 will result in reproduction of that sound by the speaker 60 located within the helmet 18. The result is a two-way communication achieved between helmets 18 and 20. If the receiving helmet has its tube 64 in the inactive position, a signal will occur in the form of a beep to inform the individual to move the tube 64 to the using position.

It is to be understood that it is within the scope of this invention that if there were other bicycle riders wearing helmets of similar construction, and such were located in close proximity to bicycle riders 10 and 12, that those individuals also would be able to communicate with riders 10 and 12.

It is further to be understood that there generally will be available a plurality of frequencies that can be selected by the individuals. Typically, there will be a least five in number of frequencies. If per chance any selected frequency is in conflict with a frequency used by other individuals, then the individuals can select a frequency that it is not in conflict. Normally the rigid shell 44 is to include a movable button 11 which is to be utilized to vary the volume emitted from the receiver included within the head wear 18 or 20.

What is claimed is:

1. A communication system to be used between a plurality of individuals, each said individual wearing head wear, said communication system comprising:

a power source mounted on each said head wear, a microphone mounted on each said head wear, said microphone comprising a first elongated rigid member having a first free outer end, a receiver mounted on each said head wear, an antenna mounted on each said head wear, said antenna comprising a second elongated rigid member having a second free outer end, said microphone and said antenna being connected by connection means forming a single unit with said first elongated rigid member extending in a direction substantially opposite to said second elongated rigid member with said first free outer end being located furthest from said second free outer end, said antenna and said microphone being movable in unison relative to each said head wear between a using position and an inactive position, with said single unit located in said using position said first free outer end of said microphone is located directly adjacent to the mouth of the individual, with said single unit located in said inactive position said first free outer end of said microphone being located remote from the mouth of the user.

2. The communication system as defined in claim 1 wherein:

said single unit being movable approximately sixty degrees between said using position and said inactive position.

3. The communication system as defined in claim 1 wherein:

said single unit being located substantially horizontal when in said inactive position when said head wear is being worn by an individual.

4. The communication system as defined in claim 1 wherein:

said single unit including detent means, said detent means functioning to lock in position said single unit when in said using position and when in said inactive position.

5. The communication system defined in claim 1 wherein:

said connection means comprises an elongated tube.

6. The communication system as defined in claim 5 wherein:

said microphone being pivotally mounted to said elongated tube permitting pivotal adjustment of the position of said microphone.

7. The communication system as defined in claim 1 wherein:

said single unit including a sound emitting speaker, said sound emitting speaker being movable along with the movement of said single unit.

8. The communication system as defined in claim 1 wherein:

said receiver containing a sound emitter which is to be activated to alert an individual when the power source for that individual is in said inactive position and an exteriorly located transmitter is attempting to make contact with that individual.

* * * * *